United States Patent [19]
Chen et al.

[11] Patent Number: 5,851,632
[45] Date of Patent: Dec. 22, 1998

[54] GRIP TAPE FOR HANDLE

[76] Inventors: Sam Hsin-Shun Chen, 13947 Carriage Rd., Poway, Calif. 92064; C. F. Chang, 403 Sha-Tien Rd., Sec. 2, Ta-Tu, Taichung, Taiwan

[21] Appl. No.: 794,013

[22] Filed: Feb. 3, 1997

[51] Int. Cl.$^6$ .............................. B32B 3/00; C21C 5/30; B25G 1/01

[52] U.S. Cl. ................ 428/156; 428/151; 428/167; 428/170; 428/192; 428/218; 264/167; 264/319; 74/551.9; 81/489; 473/301; 473/302; 473/568; 473/549

[58] Field of Search .................. 428/130, 151, 428/152, 170, 473, 540, 192, 218, 906, 156, 167, 175; 264/257, 284, 293, 319; 156/209; 473/201, 301, 302, 568, 549; 81/489; 74/551.9, 557

[56] References Cited

U.S. PATENT DOCUMENTS

| | | | |
|---|---|---|---|
| 4,174,109 | 11/1979 | Gaiser | 473/301 |
| 4,476,742 | 10/1984 | Midgley | 74/551.9 |
| 5,055,340 | 10/1991 | Matsumura | 428/172 |
| 5,158,287 | 10/1992 | Janes | 473/301 |

*Primary Examiner*—Donald Loney
*Attorney, Agent, or Firm*—Calif Tervo

[57] ABSTRACT

A grip tape 11 for applying to a handle 94 generally comprises an elongate tape having a top portion 60 comprised of shock absorbing and compressible material, such as polyurethane, bonded to a shock absorbing bottom portion 90, such as of open-pored textile material, such as of felt. The top includes a central portion 62, a right densified portion 70 adjacent the right side 50 and a left densified portion 80 adjacent the left side 40. Preferably, the tops 75, 85 of densified portions 70, 80 are below the top 65 of the central portion 62 by at least 10% of the thickness of the tape. Preferably, bottom bevels 77, 87 underlie densified portions 70, 80. Tape 11 is spiral wrapped around handle 94 such that right side 50 overlies top 85 of left densified portion 80 of the previous turn, preferably such that top 75 of right densified portion 70 is disposed below top 65 of central portion 62 of the succeeding wrap.

19 Claims, 1 Drawing Sheet

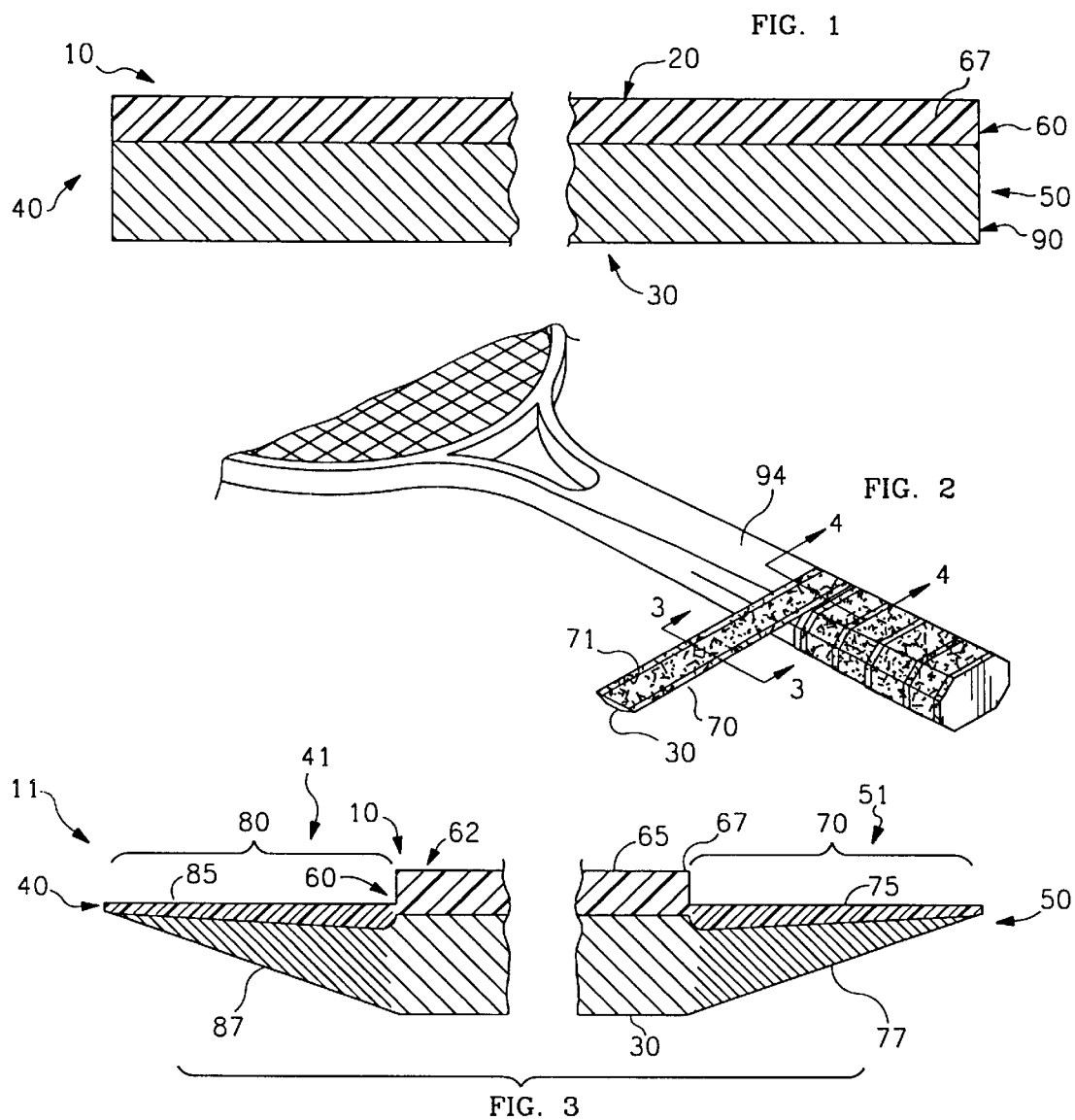

GRIP TAPE FOR HANDLE

FIELD OF THE INVENTION

This invention relates to an improved grip tape for the handle of a racquet or other device that is subject to shock when the device is impacted, such as a hammer, golf club, or baseball bat.

BACKGROUND OF THE INVENTON

Grip tape for wrapping a racquet handle to enhance grip and/or to reduce shock is well-known. Grip tapes have been made of leather, rubber and plastic. One type of conventional grip tape comprises a layer of polyurethane backed with a layer of felt. The felt layer is generally thicker than the polyurethane layer and provides part of the elasticity, strength, cushioning and shock resistance. The polyurethane layer provides a tacky gripping surface and part of the cushioning and shock resistance. The bottom of the tape may be skived (beveled) such that the tape can be spiral wrapped with overlapping edges.

A problem with conventional grip tapes is that the side edge of the tape is weak or flimsy such that during use the side has a tendency to roll up. Any such roll up of the side of the tape interferes with the grip and hand movement on the handle and therefore is undesirable.

The improved grip tape of the invention eliminates the tendency of the side of the tape to roll up.

SUMMARY OF THE INVENTION

This invention is a grip tape for applying to a handle and it generally comprises an elongate tape having a top portion comprised of shock absorbing and compressible material, such as polyurethane, bonded to a shock absorbing bottom portion, such as of open-pored textile material, such as of felt. The top includes a central portion, a right densified portion adjacent the right side and a left densified portion adjacent the left side. Preferably, the tops of the densified portions are below the top of the central portion by at least 10% of the thickness of the tape. Preferably, bottom bevels underlie the densified portions.

The preferred method of making the tape includes densifying by applying pressure or heat and pressure, such as with a pressure shoe or roller.

The tape is spiral wrapped around a handle such that the right side overlies the top of the left densified portion of the previous turn, preferably such that the top of the right densified portion is disposed below the top of the central portion of the succeeding wrap.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 1 is lateral cross sectional view, partially cut away, of conventional grip tape.

FIG. 2 is a reduced perspective view of the handle of a sporting racquet with the tape of FIG. 3 spiral wound around it according to the invention.

FIG. 3 is a lateral cross sectional view taken on line 3—3 of FIG. 2, partially cut away, of a preferred embodiment the tape of FIG. 1 after it has been beveled and densified according to the invention; the densified portions shown by the double cross-hatching.

FIG. 4 is a cross sectional view, partially cut away, taken on line 4—4 of FIG. 2 showing a preferred embodiment of the wrapping of the tape; the densified portions shown by the double cross-hatching.

DETAILED DESCRIPTION OF THE INVENTION

With reference now to the drawings, FIG. 1 is lateral cross sectional view, partially cut away, of a conventional grip tape 10. Tape 10 has a top 20, a bottom 30, a left side 40, a left portion 41 adjacent left side 40, a right side 50, a right portion 51 adjacent right side 50, and a central portion 62. Although tape 10, shown, is rectangular with a generally planar top 20 in lateral cross, the teachings of the invention are applicable to other cross sectional configurations as well. In the embodiment shown, in lateral cross section, tape 10 includes a top portion 60 comprised of grip-enhancing, shock absorbing and compressible material 67, such as polyurethane or leather. For purposes of the invention, this top portion 60 may be the entire cross section, as is common if leather is used, but generally, and as shown, tape 10 also includes a bottom portion 90 attached to top portion 60 such as by adhesive or other bonding. Bottom portion 90 is commonly a shock absorbing material, such as such as an open-pored textile, such as felt.

FIG. 2 is a reduced perspective view of the handle 94 of a sporting racquet with the tape 11 of FIG. 3 being spiral wound around it.

FIG. 3 is a lateral cross sectional view, taken on line 3—3 of FIG. 2, partially cut away, of a preferred embodiment of the grip tape 11 according to the invention. Grip tape 11 is the tape 10 of FIG. 1 after it has been beveled and densified. Material 67 of right portion 51 is densified from above to define a right densified portion 70. The densified portions are shown by the double cross-hatching. The densification may be accomplished through any of many means known in the art, such as through pressure or through heat and pressure Means such as a heated pressure shoe or a heated roller may be used. Material such as leather may be densified by application of heat and pressure. Central of right densified portion 70 is center portion 62. Right densified portion 70 has a top 75 disposed below the top 65 of center portion 62.

In a similar manner, material 67 of left portion 41 is densified from above to define a left densified portion 80. Central of left densified portion 80 is center portion 62. Left densified portion 80 has a top 85 disposed below the top 65 of center portion 62. Preferably, left and right densified portions 80, 70 are 10–40% denser than central portion 62.

The broad central portion 62, having a thickness and a top 65, lies between right densified portion 70 and left densified portion 80. The maximum thickness of tape 11 is at central portion 62. Densified portions 70, 80 are compressed such that their tops 75, 85 are a distance of at least 10% of the thickness of tape 11 below top 65 of central portion 62. Preferably, the tops 75, 85 of densified portions 70, 80 are 10–40% of the maximum thickness of tape 11 below top 65 of central portion 62. The additional stiffness of densified portions 70,80 make then much more resistant to being rolled up.

Densified portions 70,80 are much denser, stiffer and more rigid than the non-densified portion 62 or the non-densified tape 10.

In the preferred embodiment, bottom 30 is skived or beveled, such as by cutting, from bottom 30 upward to right side 50 to define a right bevel 77 and bottom 30 is skived or beveled from bottom 30 upwards to left side 40 to define a left bevel 87.

Tape 11 may include a layer of glue, adhesive or two-sided tape on all or part of its lower surface to aid in adherence upon wrapping upon handle 94.

Turning now to FIG. 4, there is shown a cross sectional view, partially cut away, taken on line 4–4 of FIG. 2 showing a preferred embodiment of the method of wrapping of tape 11. The densified portions are shown in double cross-hatching.

Tape 11 is stretched and tightly spiral wrapped around handle 94 such that tape 11 flattens against any underlying surface. On each succeeding spiral, right bevel 77 at least partially overlaps top 85 of left densified portion 80 of the previous turn such that right side 50 overlies left densified portion 80. In this manner, side 50 of right densified portion 70 is at least located in a recess below tops 65 of central sections 62. Preferably, the entire top 75 of right densified portion 70 is disposed below top 65 of the succeeding wrap as depicted in FIGS. 3 and 4. The ends of tape 11 are secured in any appropriate manner well-known in the art.

As a result of the additional stiffness of densified portion 70 and of the recessed positioning of side 50 afforded by the densification and beveling of densified portions 70,80, side 50 is not easily encountered by the user's hands and is not easily rolled up. In this manner, a superior grip is created.

Having described the invention, it can be seen that it provides for an improved grip tape and wrapping method for same. In the description and claims, the terms "left" and "right" have been used for convenience of description and, of course, are reversible as a whole due to symmetry.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

We claim:

1. A grip tape for wrapping a handle comprising:
   an elongate tape having a top, a bottom, a left side and a right side; said tape in lateral cross section including:
   a central portion having a thickness and a top;
   a right densified portion lateral said central portion and adjacent said right side; said material of said right densified portion being denser than said material of said central portion; said right densified portion having a top below said top of said central portion and having a beveled bottom; and
   a left densified portion lateral said central portion and adjacent said left side; said material of said left densified portion being denser than said material of said central portion; said left densified portion having a top below said top of said central portion and having a beveled bottom.

2. The grip tape of claim 1 wherein said tape is made of leather.

3. The grip tape of claim 1 further including in lateral cross-section:
   a top portion of a grip enhancing material; and
   a bottom portion of open-pored textile material.

4. The grip tape of claim 3 wherein said material of said top portion is polyurethane.

5. The grip tape of claim 1 wherein said right densified portion is 10–40% denser than said central portion.

6. The grip tape of claim 1 wherein said left densified portion is 10–40% denser than said central portion.

7. The grip tape of claim 1 wherein:
   said right densified portion is 10–40% denser than said central portion; and
   said left densified portion is 10–40% denser than said central portion.

8. A method of making a grip tape for a handle from an elongate strip of material; the strip having a generally planar top, a bottom, a left side, a left portion adjacent the left side, a right side, a right portion adjacent the right side and a center portion; said method comprising the steps of:
   densifying through pressure from above the right portion material such that the right portion has a top below the top of the center portion;
   densifying through pressure from above the left portion material such that the left portion has a top below the top of the center portion;
   beveling the bottom under the right portion; and
   beveling the bottom under the left portion.

9. The method of claim 8 wherein the steps of densifying further includes heating.

10. The method of claim 8 wherein the steps of densifying includes applying pressure and heat with a roller.

11. The method of claim 6 wherein the step of densifying the right portion is conducted such that the right portion is 10–40% denser than the center portion.

12. The method of claim 6 wherein the step of densifying the left portion is conducted such that the left portion is 10–40% denser than the center portion.

13. The method of claim 6 wherein:
   the step of densifying the right portion is conducted such that the right portion is 10–40% denser than the center portion; and
   the step of densifying the left portion is conducted such that the left portion is 10–40% denser than the center portion.

14. In combination:
   a handle; and
   a grip overlying said handle comprising:
      an elongate tape having a top, a bottom, a left side and a right side; said tape in lateral cross section including:
      a central portion having a thickness and a top;
      a right densified portion lateral said central portion and adjacent said right side; said material of said right densified portion being denser than said material of said central portion; said right densified portion having a top below said top of said central portion and having a beveled bottom; and
      a left densified portion lateral said central portion and adjacent said left side; said material of said left densified portion being denser than said material of said central portion; said left densified portion having a top below said top of said central portion and having a beveled bottom;
      said tape spiral wrapped around said handle such that said right side overlies said top of said left densified portion of the previous turn.

15. The combination of claim 14 wherein:
   said top of said right densified portion is disposed below said top of said central portion of the previous turn.

16. The combination of claim 14 wherein: said right densified portion is 10–40% denser than said central portion.

17. The combination of claim 14 wherein: said left densified portion is 10–40% denser than said central portion.

18. The combination of claim 14 wherein:
   said right densified portion is 10–40% denser than said central portion; and
   said left densified portion is 10–40% denser than said central portion.

19. The combination of claim 14 wherein:
   said right densified portion is 10–40% denser than said central portion;
   said left densified portion is 10–40% denser than said central portion; and
   said top of said right densified portion is disposed below said top of said central portion of the previous turn.

* * * * *